United States Patent
Fidric

Patent Number: 5,757,541
Date of Patent: May 26, 1998

[54] METHOD AND APPARATUS FOR AN OPTICAL FIBER AMPLIFIER

[75] Inventor: Bernard G. Fidric, Woodland Hills, Calif.

[73] Assignee: Litton Systems, Inc., Woodland Hills, Calif.

[21] Appl. No.: 785,808

[22] Filed: Jan. 15, 1997

[51] Int. Cl.$^6$ .............. G02B 6/26; H04B 10/24; H01S 3/30

[52] U.S. Cl. .............. 359/341; 359/134; 359/345; 385/1

[58] Field of Search .............. 359/134, 143, 359/160, 341, 345; 372/6, 70; 385/1

[56] References Cited

U.S. PATENT DOCUMENTS

| | | |
|---|---|---|
| 3,826,992 | 7/1974 | Friedl. |
| 4,515,431 | 5/1985 | Shaw et al.. |
| 4,546,476 | 10/1985 | Shaw et al.. |
| 4,553,238 | 11/1985 | Shaw et al.. |
| 4,554,510 | 11/1985 | Shaw et al.. |
| 4,603,940 | 8/1986 | Shaw et al.. |
| 4,674,830 | 6/1987 | Shaw et al.. |
| 5,048,026 | 9/1991 | Shaw et al.. |
| 5,282,079 | 1/1994 | Laming et al.. |
| 5,548,438 | 8/1996 | Delavoux .............. 359/341 |
| 5,596,667 | 1/1997 | Watanbee .............. 385/1 |

OTHER PUBLICATIONS

Brochure by OFR Fiber-Optic Products. New Product 1991–92, Fiber–Optic Circulator (Isolator) (Polarization Independent) published by Optics For Research, Inc.

Reprint of article from Jan. 1992 issue of Photonics Spectra by Laurin Publishing Co., Inc. entitled New 3–Port/4–Port Optical Circulator from '92 Tech Trends col.

Preliminary Brochure by JDS Fitel, Inc. entitled "CR1500 Series Optical Circulators" identified as MKT–DS–0066 Rev. A Feb. 1996.

Nishi et al. E COC '90–99, SEI 94–96, 4 Pgs.

Sato et al. OAA '91, Jul. 26, 1991, SEI 94–49, 4 Pgs.

Bernard et al. IEEE Photanier Tech. Left., vol. 4, #8, PP911–913, Aug. 1992.

*Primary Examiner*—Nelson Moskowitz
*Attorney, Agent, or Firm*—Price, Gess & Ubell

[57] ABSTRACT

An amplifier method and apparatus for use with optic systems utilizing a fiber optic circulator to direct input signals to a splitter that splits the copropagating pump light and input signals into two equal parts for simultaneous introduction into the two opposite ends of the active gain fiber. Half of the pump light and half of the signal are propagating through the active fiber in a clockwise and counterclockwise direction at the same time. This bidirectional propagation results in a more uniform excitation along the entire length of the active fiber, providing uniform stimulation of photon emission at both ends, causing significantly reduced noise and higher gain of the signal. Two half-amplified signals are combined and supplied to the circulator that provides the amplified output signal without any residual pumping light at the input or the output port of the circulator.

12 Claims, 4 Drawing Sheets

1

METHOD AND APPARATUS FOR AN OPTICAL FIBER AMPLIFIER

BACKGROUND OF INVENTION

1. Field of the Invention

The present invention relates to optical fiber amplifiers and, more particularly, to an improved apparatus for amplifying optical signals utilizing an optical amplifying fiber and a source of pumping illumination.

2. Description of Related Art

Since the development of amplifiers for optical signals, efforts have been made to improve the optical amplifying fiber into which an optical signal to be amplified and pump light are propagated, causing amplification of the optical signal. Such optical amplifying fibers are commonly known as "active fibers." Although improvements in such active fibers have occurred, certain aspects of the amplification of optical signals, no matter what active fiber is used, still need improvement. There is still a need for improvement in the structure and operation of systems for introducing optical signals and pumping light into active fibers and for receiving amplified signals from such active fibers.

Structures have been proposed which copropagate the pump light and the optical signal through a wavelength division multiplexer ("WDM"). As used in this application, "copropagation" refers to propagation of two signals or of one signal and pumping light in the same direction through an optical fiber. An example of a wavelength division multiplexer is described and shown in U.S. Pat. No. 4,674,830 issued to Shaw et al. on Jun. 23, 1987.

The utilization of copropagation in an active fiber to provide for amplification has certain disadvantages. The intensity of the pump light diminishes as the pump light is propagated away from the input end of the active fiber. As a result, less and less population inversion occurs at locations further away from the input end of the active fiber.

In a copropagation structure the active fiber and the WDM couples the input signal $\lambda_s$ and pump light into the active fiber at the same end and the amplified signal exits at the other end. Optical isolators may also be used at either end in order to avoid amplification of the back reflections. These copropagation structures provide relatively low conversion efficiency of the pump light. There is undesirable residual pump energy appearing at the output. The pump excitation in the active fiber is nonuniform and nonsymmetrical in the longitudinal direction, which is due primarily to the diminishing intensity of the pump light as the light propagates away from the input end of the active fiber to the output end.

Examples of prior art optical fiber amplifier utilizing an active fiber and an WDM are illustrated in FIGS. 1 and 2. FIG. 1 illustrates a conventional copropagating pump optical fiber amplifier with input and output isolators. An input signal $\lambda_s$ is supplied at input 13 through input isolator 15 to the WDM 16. The WDM 16 couples pump energy $\lambda_p$ at input 21 from light pumping source 19 into one end of active fiber 11. The WDM 16 also couples the input signal $\lambda_s$ into the same end of active fiber 11 so that the pumping light 23 and the input signal $\lambda_s$ 25 copropagate through the active fiber 11. Even though the output isolator 27 is tuned to the wavelength of the input signal $\lambda_s$, a certain amount of pump energy, which will be referred to herein as "residual pump" propagates to the output 28 of the output isolator 27.

Copropagation of the pump light 23 with the input signal 25 through the active fiber 11 amplifies the input signal $\lambda_s$. The copropagation amplifier illustrated in FIG. 1 provides low noise amplification, recommending it for preamplification applications. However, it has a non-uniform, non-symmetrical longitudinal pump excitation and low power conversion efficiency, making it unsuitable for booster amplifier applications. The residual pump power at the output requires additional costly filters to eliminate.

FIG. 2 illustrates a conventional counterpropagating pump optical fiber amplifier with input and output isolators. An input signal $\lambda_s$ is supplied at input 13 through an isolator 15 to the active fiber 11. The WDM 17 couples pump energy at input 21 from light pumping source pump 19 into one end of active fiber 11 so that the pumping light 23 is coupled into the active fiber 11 to provide for counterpropagation of pump light 23 with the input signal $\lambda_s$ 25. Despite the input isolator 15, a certain amount of pump energy ("residual pump") propagates to the input 13 of the optical fiber amplifier.

Counterpropagation of the pump light 23 with the input signal $\lambda_s$ 25 through the active fiber 11 amplifies the signal $\lambda_s$. The WDM 17 allows the amplified signal $\lambda_s$ to be propagated through the output isolator 27 to output 29. The counterpropagating pump optical fiber amplifier illustrated in FIG. 1 provides high power conversion efficiency, recommending it for use as a booster amplifier. The amplifier of FIG. 1, however, exhibits nonuniform, nonsymmetrical longitudinal pump excitation and a higher noise component, not recommending it for preamplifier use. Furthermore, the residual pump power at the input 13 requires the use of additional costly filters to eliminate.

Others have suggested the use of relatively costly approaches in an attempt to achieve more uniformity of pump light in the active fiber, lower noise, and higher output than in the above-described single pump structures. For example, Shaw et al. (U.S. Pat. No. 4,674,830) shows a system which utilizes two pumps to supply pump light to two respective WDMs which are connected to opposite ends of the active fiber (see FIG. 12 of Shaw et al.). In this arrangement, the signal from each pump via its respective WDM propagates and counterpropagates through the active fiber. The signal to be amplified counterpropagates with the energy from one of the pump sources. This arrangement only achieves quasi-uniform/symmetrical longitudinal pump excitation. Such an arrangement still requires isolators between the WDM and the input and the other WDM and the output. The number of components and consequential cost of the structure is increased, and additional isolators are required to avoid mutual detrimental effects between the two pumps. There is undesirable residual pump light not only at the input, but also at the output due to the counterpropagation of the two pump lights.

With the introduction of a relatively new structure called an optical circulator, optical fiber amplifier systems have been devised utilizing such circulators.

Such fiber optic circulators are available in the market as a low insertion loss, three or more port, coupling device that utilizes optical isolator technology. Such optical circulators are manufactured by OFR, Inc. of Caldwell, N.J., for example. Such an optical circulator offers insertion losses of each channel at or near 1 dB, which is a considerable improvement over the higher loss 3 dB splitters. Another company manufacturing optical circulators having specified features is JDS Fitel Inc. of Napean, Ontario, Canada. As described in the literature produced by these manufacturers, a three-port optical circulator isolates the signal introduced at a first port completely from the third port, but transmits the signal to a second port. Any reverse signal introduced into the second port is completely isolated from the first port, but is transmittable to the third port. The manufacturers of these circulators market them as replacements for 3 dB splitters.

If one follows the advice of such marketing literature and replaces splitters and isolators in a counterpropagating optical amplifier configuration such as shown in FIG. 2, one would replace the WDM 17 isolator 27 of FIG. 2 with an optical circulator 31 as shown in FIG. 3. The first port of the circulator 31 would receive the pump light 33, which would be output at the second port 23 to counterpropagate through the active fiber 11 with the input signal $\lambda_s$. The amplified input signal 25 exiting active fiber 11 would enter the second port and be transmitted to the third port to exit as the amplified signal at output 39. Even though an optical circuit is utilized, thereby replacing a WDM and isolator at the output, an isolator at the input is still required. There is still undesirable residual pump light at the input 13, and pump excitation in the active fiber is still nonuniform and nonsymmetrical in the longitudinal direction of the active fiber. In short, the structure of FIG. 3 using the optic circulator has the same disadvantages as the structure of FIG. 2, even though the WDM 17 and isolator 27 have been replaced by the optical circulator 31.

Manufacturers of the fiber optic circulator have suggested use of the optic circulator in a slightly different configuration, as illustrated in FIG. 3. In such a configuration, the first port of the circulator receives the input signal $\lambda_s$ at input 13 to be amplified, which is transmitted to the second port, which is connected to an optical fiber amplifier 47. The input signal 43 is supplied to the optical fiber amplifier 47, which includes a pump source therein and standard copropagation or counterpropagation configuration. As is known in the prior art, input signal $\lambda_s$ 43 is amplified to be signal 49, which is reflected by mirror surface 53. The amplified signal 49 is transmitted from port 2 to port 3 as output signal 55. Use of the optical circulator 31 in the configuration of FIG. 3 improves system transmission losses, but still has the disadvantages of residual pump energy at the output at port 3. Pump excitation in the active fiber is still nonuniform and nonsymmetrical in the longitudinal direction. There is relatively low conversion efficiency of the pump light.

More recently, a repeated bidirectional erbium amplifier repeater (BEAR) 10-Gbit/s 240-km fiber transmission experiment was reported by J.-M. P. Delavaux et al. of AT&T Bell Laboratory Solid State Technology Center in OTC 96, Santa Jose, February 1996. In this reported experiment, each of two branches of an optical fiber amplifier structure was provided with a pair of active fibers connected in series by an isolator. Each branch was supplied with pump light from a source which fed through a coupler to separate WDMs. The WDMs were connected so that one active fiber in one of the branches is forward pumped relative to the input signal (copropagating the input signal and the pump light), and the other active fiber in that branch was backward pumped relative to the input signal (counterpropagating the input signal and the pump light). Opposite ends of each branch were connected to a selected port of one of the two optical circulators. In this manner, each circulator inputs a signal to be amplified into one branch, while the same circulator allows an amplified signal from the other branch to be output.

Although the use of the two circulators in this arrangement eliminates the previously-used isolators, the structure first introduces the input signals into the backward pumped active fiber (the pump light and the signal to be amplified are counterpropagating). With the signal to be amplified first counterpropagating gating relative to the pump light, more noise tends to be introduced into the signal than if the signal were introduced in a copropagating environment. Furthermore, because the pump light propagates in opposite directions in common branches toward the circulator, there is always undesirable residual pump light at each of the output ports. Finally, one must be very careful is selecting optical connectors for use with these circulators, since any signal which is fed back from a connector will be introduced as a signal on the branches and amplified.

Despite the widespread use of optical fiber amplifiers as discussed above in substantial numbers of systems throughout the world, there is still a need for an improved method and apparatus for an optical amplifier which can provide higher gain arid lower noise with fewer components. This need is met by the present invention.

OBJECTS AND SUMMARY OF THE INVENTION

It is an object of this invention to provide an optical fiber amplifier that provides higher gain and lower noise in the output signal;

It is another object of this invention to provide an optical fiber amplifier that does not have any residual pumping light at the input or output port;

It is yet another object of this invention to provide an optical fiber amplifier that utilizes fewer components;

It is yet another object of this invention to provide an optical fiber amplifier that does not use a wavelength device multiplexer (WDM) coupler; and It is still another object of this invention to provide an optical fiber amplifier that does not utilize an optical isolator.

These objects and the general purpose of this invention are obtained by splitting the copropagating pump light and input signal into two parts and supplying the two parts simultaneously into respective ends of the active fiber causing simultaneous clockwise and counterclockwise propagation. The input signal is supplied through an optical circulator which has three ports; input, output, and bidirectional. The input and output ports of the circulator are isolated from each other. The bidirectional port supplies the input signal to a 3 dB coupler that also receives the pumping light and splits the copropagating input signal and pump light into two equal parts. The 3 dB coupler combines the amplified signal from each end of the active fiber and supplies it to the bidirectional port of the circulator, which circulates it to the output port. The active fiber may be constructed, or controlled, to maintain polarization of the separate supply signals counterpropagating through the active fiber, thereby maximizing the amplified signal (via constructive interference) and eliminating any residual pump light (via destructive interference) at the input and output ports of the circulator.

BRIEF DESCRIPTION OF THE DRAWINGS

These and other objects and the advantages of the present invention will be readily appreciated and become better understood by reference to the following detailed description when considered in conjunction with the accompanying drawings, in which like reference numerals designate like parts throughout the figures thereof, and wherein.

DESCRIPTION OF THE PREFERRED EMBODIMENTS

Figure 1:
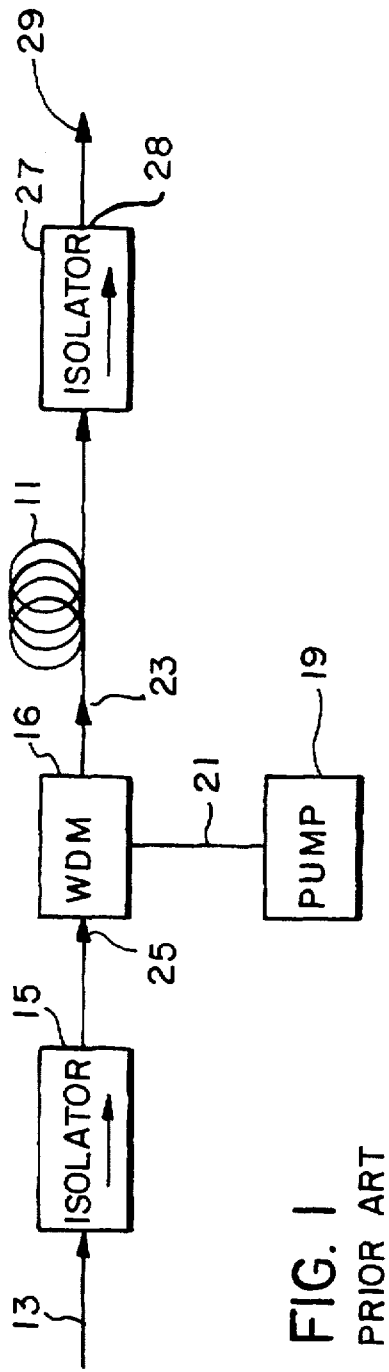
FIG. 1 is a circuit diagram of a prior art copropagating pump optical fiber amplifier.
Figure 2:
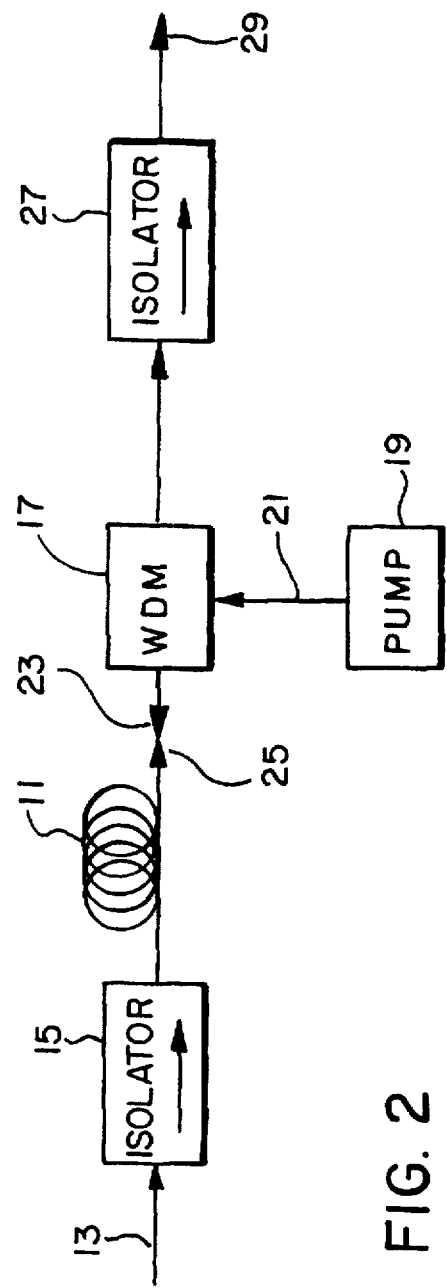
FIG. 2 is a circuit diagram of a prior art counterpropagating pump optical fiber amplifier.
Figure 3:
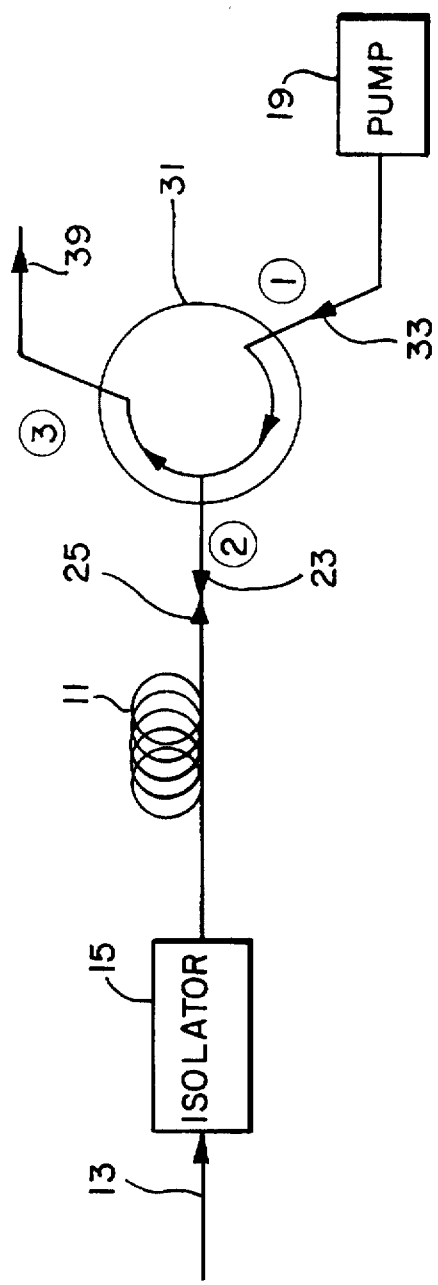
FIG. 3 is a circuit diagram of a prior art optical fiber amplifier using an optical circulator.
Figure 4:
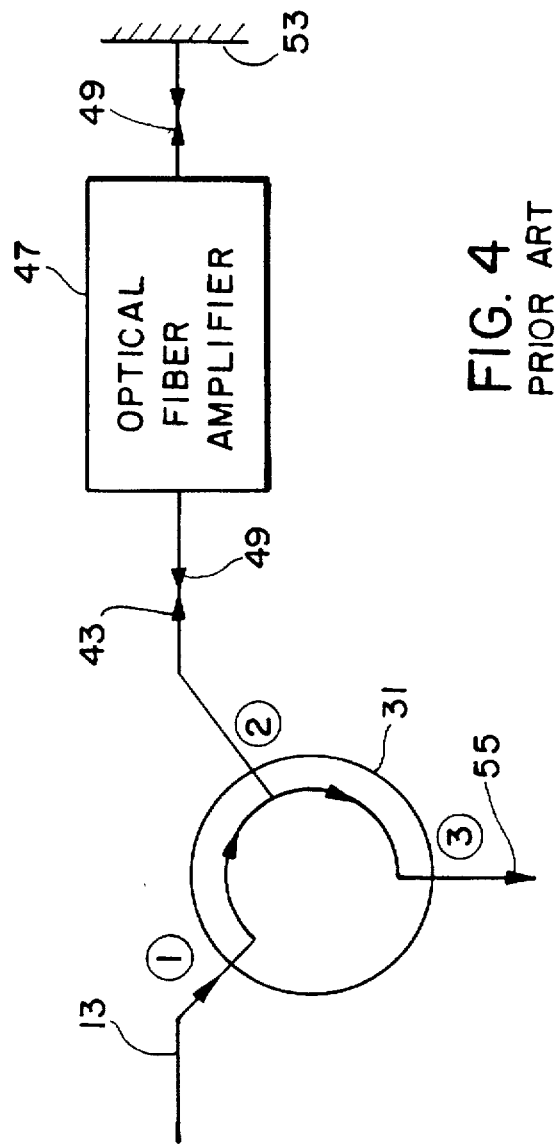
FIG. 4 is a block diagram of a prior art optical fiber amplifier configuration using an optical circulator.
Figure 5:
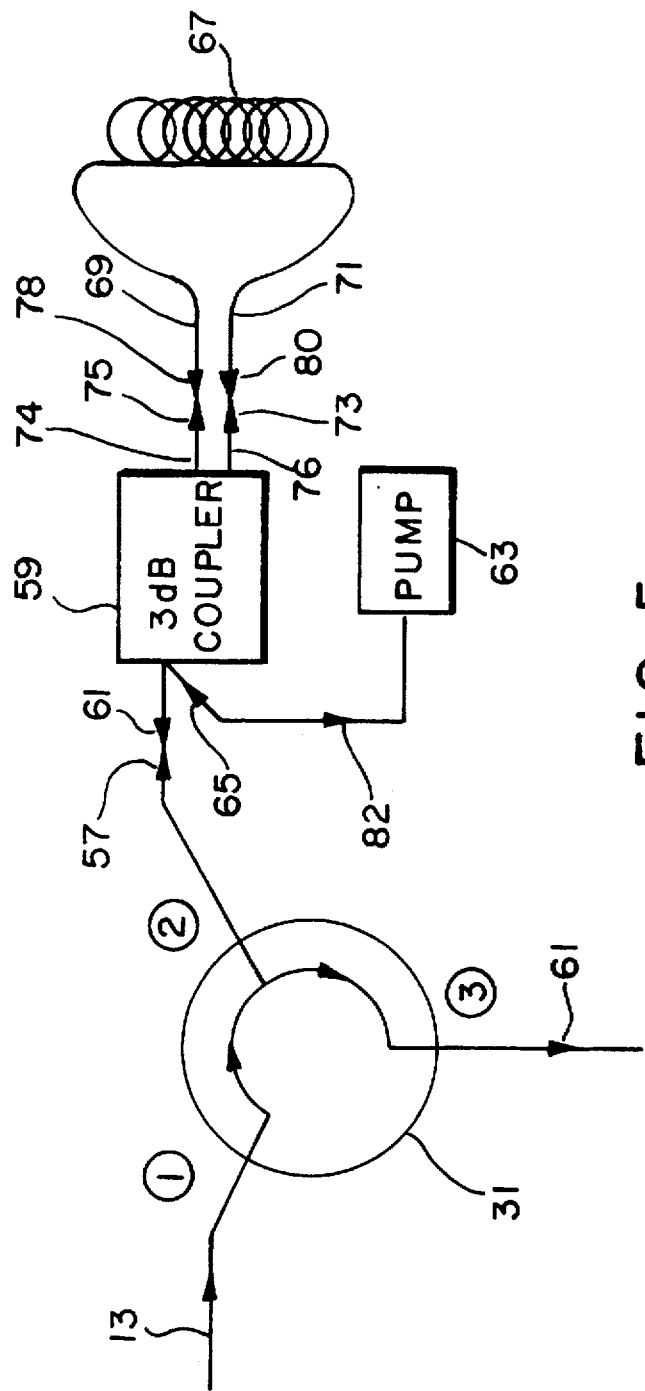
FIG. 5 is a circuit diagram of a preferred embodiment of an optical fiber amplifier according to the present invention.

Referring now to the drawings, the preferred embodiment of the present invention is shown in FIG. 5 as an optical amplifier for amplifying an input signal $\lambda_s$ provided at input 13 to port 1 of an optical circulator 31. In response to pumping energy supplied by a pump source 63, an amplified signal 61 is circulated to port 3 of circulator 31 as an output.

The optical circulator 31 is provided with three ports. The first port, "1," which receives the input signal, is optically coupled to the second port, "2." The second port is optically isolated from the first port so that an amplified signal input to the second port: is not propagated back to the first port. The second port is optically coupled to the third port, "3," to supply the amplified signal coming in to the second port to the third port for output as the amplified output signal 61 of the amplifier. The third port is optically isolated from the first port as well.

The preferred embodiment of FIG. 5 of the optical fiber amplifier includes a bidirectional 3 dB coupler 59 which is known as a Y coupler or 3 dB splitter. Such 3 dB couplers may be made of standard single mode fiber, or preferably, of polarization maintaining fiber. Both types are available commercially. The common purpose of a 3 dB coupler is to evenly divide an input signal into two independent fiber channels 74 and 76. The coupler 59 is provided with an input signal 57 to be amplified from port 2 of the optical circulator 31. The coupler 59 also receives, at its input, pump light 65 from pump source 63. The 3 dB coupler has two separate outputs, 74 and 76, each of which receives half of the input signals supplied to the 3 dB coupler 59. The pump light 65 and the input signal 57 to be amplified are supplied to the input of the 3 dB coupler 59 so that they copropagate. Half of the copropagating pump light and input signal 75 is on the first output 74 of the coupler 59. The other half of the copropagating pump light and input signal 73 is on the second output 76 of the coupler 59.

An active fiber 67 having a first end 69 and second end 71 with a fiber length between the ends is made from material that tends to amplify the input signal in response to pump light propagating through the fiber. The first and second ends of the active fiber 69, 71 are optically connected to the respective first and second outputs 74, 76 of the 3 dB coupler 59. The 3 dB coupler 59 thus supplies to both ends of the active fiber 67 half of the input signal and half of the pump light. The active fiber 67 amplifies each half input signal in response to each half pump light to form amplified "half signals" which counterpropagate in the active fiber from one end of the fiber to the other end of the fiber. Both ends 69, 71 of active fiber 67 are both input and output.

The respective counterpropagating amplified half signals 78, 80 are received by the first output/input 74 and second output/input 76 of the 3 dB coupler 59. The coupler 59 optically combines the two amplified half signals to form the amplified signal 61, which is supplied to the second port of circulator 31. The circulator 31 provides the signal to the third port as the amplified output 61 of the amplifier.

The pump 63 may be any suitable source of laser light, such as an InGaAsp high powered laser diode, for example, or any other laser which may be elected to pump light at various wavelengths, as desired for the utmost efficiency, depending upon the active fiber 67 that is being utilized.

Amplification of the input signal takes place in the active fiber 67. The fiber may be in the form of a core provided with cladding. Many types of active fiber may be used. A preferred type of active fiber includes the core formed from a codoped glass fiber such as that described in an article entitled "Erbium Fiber Laser Amplifier at 1.55 Microns With Pump at 1.49 Microns and Yb Sensitized Er Oscillator" by E. Snitzer, H. Po, F. Hakimi, R. Tumminelli, and B. C. McCoullum. The particular amount of dopant Er+ may be selected according to the amount of amplification desired. Amplification relates to the length of the active fiber used. The higher the Er+ concentrations, the shorter the active fiber may be for the same gain. In the preferred embodiment, the active fiber is preferably less than fifty (50) meters long.

Other types of cores formed from different fibers and with other dopant materials may also be used as disclosed in the prior art.

According to the preferred embodiment, the active fiber is preferably made from polarization maintaining (PM) material. Such a fiber is made by LYCOM, in Denmark. The use of the PM characteristic in the active fiber is to obtain constructive (proper) interference of the two equal halves of the amplified input signals into the combined output 61 through the 3 dB coupler 58. It also contributes to constructive (proper) interference of the two equal halves of the residual pump light into combined residual pump light 82 through the same 3 dB coupler 59. Thus, the amplified signal 61 is not contaminated by the residual pump light. This may also be accomplished, in the alternative, by a polarization controller which is coupled into the loop of the active fiber 67.

The two equal halves of the pump light and input signals 75, 73 on the two outputs 74, 76 of the 3 dB coupler are supplied to the two ends 69, 71, respectively, of the active fiber 67. The two equal halves of the pump light and input signal 75, 73 being supplied to the active fiber 67 are copropagating as they enter their respective ends 69, 71 of the active fiber 67. As these half copropagating signals traverse the active fiber 67 in opposite directions, the half signals are counterpropagating through the active fiber. This counterpropagation enables the sum (at any point along the length of the active fiber) of the undepleted pump light propagating from a first end of the active fiber and of the undepleted pump light propagating from the second end of the active fiber to have a significantly greater intensity than if the pump light were only introduced into the first end of the active fiber.

Figure 6:
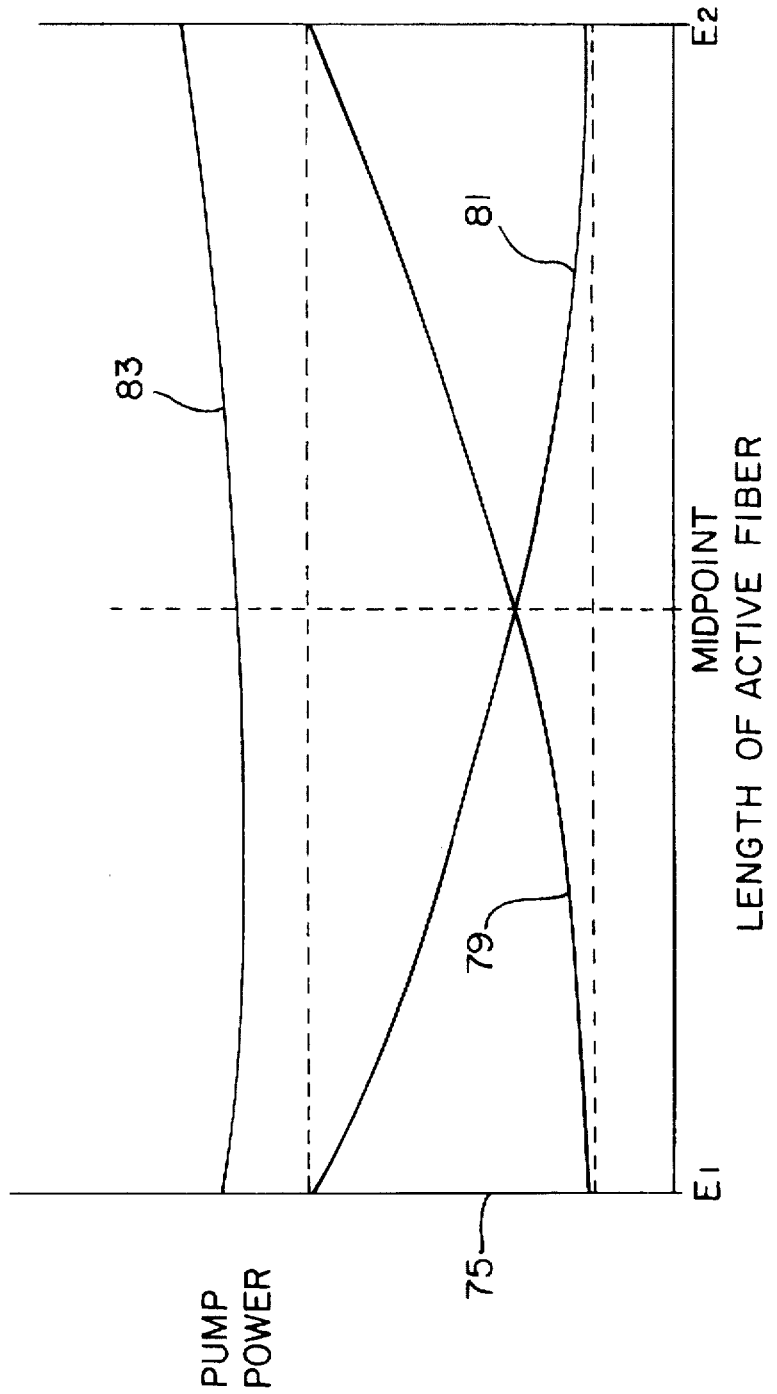
FIG. 6 is a graph of pump light intensity versus length of the active fiber of the optical fiber amplifier of FIG. 5.

As can be seen in FIG. 6, which graphs the pump power from one end $E_1$ to the other $E_2$ of the active fiber, the pump light entering at the $E_1$ end of the fiber shown by curve 81 gradually decreases as it traverses to the other end. The pump light entering at the second end $E_2$ of the active fiber 79 gradually decreases until it exits at the first end $E_1$. The sum of the undepleted pump light illustrated by curve 83 has a greater amplitude along the length of the entire active fiber at a more constant level than either one of the half pump lights 79, 81 entering at opposite ends of the active fiber. As a result, the signal to be amplified at each point stimulates greater emission and significantly reduces the amount of noise generated at each point along the length of the fiber as compared to the amount of noise generated by the depleted pump light in the case where only one end is pumped.

This simultaneous introduction of both pump light and the signal to be amplified into each end of the active fiber more uniformly stimulates emission of photons at both ends of the active fiber and along its entire length. This significantly reduces the undesired spontaneous emission of photons at each of these ends, substantially reducing the noise generated.

Thus, it can be seen that the present invention, besides utilizing a minimum of components, an optical circulator, a 3 dB coupler, a pumping source, and a lasing active fiber, utilizes copropagation of the pump light and the input signal simultaneously with counterpropagation of the two equal halves of the copropagating input signals to provide an optical fiber amplifier which has the advantages noted. That is, there is uniform excitation along the active fiber producing high gain and low noise and any residual pump light 81 is shunted through pump source 63, eliminating pump energy at the input 13 or output 61, ports 1 and 3 respectively, of circulator 31.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An optical fiber amplifier for amplifying an input signal, comprising:
   an active fiber having a first end and a second end, said first end receiving a first copropagating pump light and input signal at the same time as said second end receives a second copropagating pump light and input signal, said first and second copropagating pump light and input signals being substantially equal and counterpropagating along the length of said active fiber to amplify the first and second input signals; and
   means for combining the amplified first and second input signals.

2. The optical fiber amplifier of claim 1 wherein said combining means comprises an optical splitter.

3. The optical fiber amplifier of claim 2 wherein said optical splitter receives copropagating pump light and input signals and splits each into two separate optical paths, each path containing one-half of the copropagating pump light and input signal.

4. The optical fiber amplifier of claim 3 further comprising an optical circulator having a first port, a second port, and a third port, said first port connected for receiving said input signal, said second port connected to said optical splitter for supplying said input signal to said optical splitter, said third port connected to output said amplified first and second input signals.

5. A method for amplifying an optical input signal, comprising the steps:
   copropagating the input signal with pump light;
   splitting the copropagating input signal and pump light into first and second separate optical paths, each path carrying a portion of the input signal and pump light;
   counterpropagating the input signal and pump light from said first path with the input signal and pump light from said second path through an active fiber to amplify the input signals from said first and second paths; and
   combining the amplified input signals from said first and second paths.

6. The method of claim 5 wherein said splitting step comprises splitting said copropagating input signal and pump light into two equal halves.

7. An optical fiber amplifier for amplifying a signal, comprising:
   a source of pump light;
   an optical circulator having a first port optically connected to receive said signal, said circulator having a second port and an amplified signal output port;
   an optical splitter optically connected to said second port to receive said signal and being optically connected to said source to receive said pump light, said splitter having first and second output ports, each of which outputs half of said signal and half of said pump light; and
   an active fiber having opposite ends, one of said opposite ends being optically connected to said first output port of said splitter, the other of said opposite ends being optically connected to said second output port of said splitter, said active fiber being responsive to the respective halves of said pump light and said signal for amplifying said half signal;
   said output ports of said splitter receiving said amplified half signals, said splitter optically combining said amplified half signals to form an amplified combined signal at said second port of said circulator;
   said circulator propagating said amplified combined signal to said third port.

8. An optical fiber amplifier for amplifying a signal, comprising:
   an optical circulator having a first port receptive to said signal and optically connected to a second port to supply said signal thereto, said first port being optically isolated from a third port, said second port being optically isolated from said first port so that no reverse signal that is input to said second port is propagated to said first port, said second port being optically connected to said third port to supply to said third port a reverse amplified signal input that is input to said second port, said third port being optically isolated from said first port;
   a source of pump light;
   an active fiber having a first end, a second end, and a length between said ends;
   an optical 50/50 splitter having an input port optically connected to said second port to receive said signal received by said first port, said splitter being optically connected to said source to also receive said pump light, said splitter having first and second outputs, each of which outputs half of said signal and half of said pump light;
   said first end of said active fiber being optically connected to said first output of said splitter, said second end of said active fiber being optically connected to said second output of said splitter, said length of said active fiber being responsive to said half of said pump light and said half of said signal from each of said first and second ends of said active fiber for amplifying each of said half signals;
   said outputs of said splitter receiving said amplified half signals, said input port of said splitter optically connecting said amplified half signals to said second port of said circulator as said reverse amplified signal;
   said circulator propagating said reverse amplified signal from said second port to said third port.

9. An amplifier for amplifying an input signal propagated on an optical input fiber, comprising:
   an optical circulator having a first port optically connected to said optical input fiber to receive said input signal, said first port being optically connected to a second port to supply said input signal thereto, said first port being optically isolated from a third port, said second port being optically isolated from said first port so that an amplified signal that is input to said second port is not propagated to said first port, said second port being optically connected to said third port to supply to said third port said amplified signal that is input to said second port for output from said amplifier, said third port being optically isolated from said first port;

a source of pump light;

an active fiber having a first end, a second end, and a length between said ends, said length of said active fiber being made from a material capable of amplifying said input signal in response to said pump signal;

an optical 50/50 splitter having an input port optically connected to said second port, said splitter being optically connected to said source, said splitter having first and second outputs each of which outputs half of said input signal and half of said pump light; and said first end of said active fiber being optically connected to said first output of said splitter and said second end of said active fiber being optically connected to said second output of said splitter to receive counterpropagating halves of said pump light and halves of said input signal from respective ones of said first and second ends of said active fiber, said halves of said input signal being amplified by said length of said active fiber;

said first and second outputs of said splitter receiving respective ones of said amplified half signals, said splitter optically combining said amplified half signals as an amplified signal supplied from said input port to said second port of said circulator;

said circulator propagating said amplified signal from said second port to said third port.

10. An amplifier for amplifying an input signal in response to a pump signal, comprising:

a source of said pump signal;

an active fiber having a first end, a second end, and a length between said ends, said length of said active fiber being made from material that amplifies said input signal in response to said pump signal;

an optical 50/50 splitter having an input port, said splitter being optically connected to said source, said splitter having first and second outputs, each of which outputs half of said input signal and half of said pump light;

said first end of said active fiber being optically connected to said first output of said splitter and said second end of said active fiber being optically connected to said second output of said splitter to receive counterpropagating halves of said pump light and halves of said input signal from respective ones of said first and second ends of said active fiber, said counterpropagating halves of said input signal being amplified by said length of said active fiber;

an optical circulator having first, second and third ports; said first port receptive to said input signal, said first port optically connected to said second port to supply said input signal thereto, said first port being optically isolated from said third port, said second port being optically isolated from said first port so that a signal input to said second port is not propagated to said first port, said second port being optically connected to said third port to supply an amplified signal input to said second port to said third port for output from said amplifier, said third port being optically isolated from said first port;

a source of pump light;

said first and second outputs of said splitter receiving respective ones of said amplified half signals, said splitter optically combining said amplified half signals to form an amplified signal supplied from said input port to said second port of said circulator;

said circulator propagating said amplified signal from said second port to said third port.

11. An amplifier for amplifying an input signal in response to a pump signal to form an amplified signal, comprising:

an optical circulator having first, second and third ports; said first port being receptive to said input signal, said first port being optically connected to said second port, said first port being optically isolated from said third port, said second port being optically isolated from said first port so that an amplified signal input to said second port is not propagated to said first port, said second port being optically connected to said third port to supply said amplified signal from said second port to said third port for output from said amplifier, said third port being optically isolated from said first port;

an optical 50/50 splitter having a pump signal port to receive said pump signal, said splitter having an input signal port to receive said input signal, said splitter having first and second output ports each of which outputs half of said input signal and half of said pump light; and an active fiber having a first end, a second end and a length between said ends, said length of said active fiber being made from material that amplifies said input signal in response to said pump signal, said first and second ends of said active fiber being optically connected to said respective first and second output ports to supply to opposite ends of said length of said active fiber said half of said input signal and said half of said pump light, said active fiber amplifying each said half input signal in response to each said half pump signal to form amplified half signals oppositely propagating in said active fiber from one said output port to said other output port;

said first and second outputs of said splitter receiving respective ones of said oppositely propagating amplified half signals, said splitter optically combining said amplified half signals to form an amplified signal supplied to said second port of said circulator;

said circulator propagating said amplified signal from said second port to said third port.

12. A method of amplifying an input signal in response to pump light to form an amplified output signal, comprising the steps of:

providing an optical circulator having first, second and third ports; said first port being receptive to said input signal, said first port being optically connected to said second port, said first port being optically isolated from said third port, said second port being optically isolated from said first port so that said amplified signal input to said second port is not propagated to said first port, said second port being optically connected to said third port to supply said amplified signal from said second port to said third port for output from said amplifier, said third port being optically isolated from said first port;

connecting said first port of said optical circulator to said input signal to output said input signal from said second port;

splitting said pump light and said input signal from said second port to output two separate supply signals, each of said supply signals including half of said pump light and half of said input signal;

counterpropagating said separate supply signals through an active optical amplifier fiber to generate two half amplified signals at opposite ends of said active fiber;

combining said two half amplified signals from said ends to form said amplified signal; and applying said amplified signal to said second port of said optical circulator to circulate said amplified signal to said third port for output as said amplified output signal.

* * * * *